US012208315B2

(12) United States Patent
Mochizuki et al.

(10) Patent No.: US 12,208,315 B2
(45) Date of Patent: Jan. 28, 2025

(54) GOLF BALL

(71) Applicant: BRIDGESTONE SPORTS CO., LTD., Tokyo (JP)

(72) Inventors: Katsunobu Mochizuki, Saitamaken (JP); Jun Shindo, Saitamaken (JP)

(73) Assignee: BRIDGESTONE SPORTS CO., LTD., Tokyo (JP)

( * ) Notice: Subject to any disclaimer, the term of this patent is extended or adjusted under 35 U.S.C. 154(b) by 0 days.

(21) Appl. No.: 18/084,030

(22) Filed: Dec. 19, 2022

(65) Prior Publication Data
US 2023/0191204 A1  Jun. 22, 2023

(30) Foreign Application Priority Data
Dec. 20, 2021 (JP) .................................. 2021-206086

(51) Int. Cl.
| A63B 37/06 | (2006.01) |
| A63B 37/00 | (2006.01) |
| C08K 13/02 | (2006.01) |
| C08L 9/00 | (2006.01) |
| C08K 3/22 | (2006.01) |
| C08K 5/053 | (2006.01) |
| C08K 5/098 | (2006.01) |
| C08K 5/14 | (2006.01) |

(52) U.S. Cl.
CPC ...... *A63B 37/0063* (2013.01); *A63B 37/0074* (2013.01); *C08K 13/02* (2013.01); *C08L 9/00* (2013.01); C08K 2003/2296 (2013.01); C08K 5/053 (2013.01); C08K 5/098 (2013.01); C08K 5/14 (2013.01); C08K 2201/014 (2013.01)

(58) Field of Classification Search
CPC .............. A63B 37/005; A63B 37/0051; A63B 37/0059
See application file for complete search history.

(56) References Cited

U.S. PATENT DOCUMENTS

| 4,272,079 | A  | * | 6/1981  | Nakade     | C08L 23/0876 473/363 |
| 6,130,295 | A  | * | 10/2000 | Yokota     | A63B 37/0003 473/378 |
| 6,306,049 | B1 | * | 10/2001 | Rajagopalan | A63B 37/0003 525/196 |
| 6,664,334 | B2 | * | 12/2003 | Iwami      | C08F 8/44 473/378 |
| 6,747,110 | B2 | * | 6/2004  | Rajagopalan | A63B 37/0043 473/378 |
| 6,756,436 | B2 | * | 6/2004  | Rajagopalan | A63B 37/0043 524/394 |
| 6,767,940 | B2 | * | 7/2004  | Voorheis   | A63B 37/0003 473/378 |
| 6,852,784 | B2 | * | 2/2005  | Sullivan   | A63B 37/008 524/394 |
| 7,135,529 | B2 | * | 11/2006 | Sullivan   | A63B 37/0003 473/378 |
| 7,138,460 | B2 | * | 11/2006 | Sullivan   | A63B 37/0003 473/378 |
| 7,172,520 | B2 | * | 2/2007  | Fushihara  | A63B 37/0064 473/374 |
| 7,357,735 | B2 | * | 4/2008  | Sullivan   | A63B 37/0062 473/374 |
| 7,358,310 | B2 | * | 4/2008  | Voorheis   | A63B 37/0064 524/238 |
| 7,393,288 | B2 | * | 7/2008  | Egashira   | A63B 37/0003 473/351 |
| 7,559,856 | B2 | * | 7/2009  | Shindo     | A63B 37/0023 473/378 |
| 8,575,278 | B2 | * | 11/2013 | Kim        | A63B 37/0003 473/378 |
| 8,784,236 | B2 | * | 7/2014  | Sullivan   | A63B 37/0076 473/373 |
| 8,992,342 | B2 | * | 3/2015  | Sullivan   | A63B 37/02 473/376 |
| 9,707,453 | B2 | * | 7/2017  | Sullivan   | A63B 37/0059 |
| 10,010,765 | B2 | * | 7/2018 | Sullivan   | A63B 37/0049 |
| 2002/0086745 | A1 |   | 7/2002  | Rajagopalan | |
| 2003/0236353 | A1 | * | 12/2003 | Rajagopalan | A63B 37/0061 525/199 |
| 2004/0019138 | A1 | * | 1/2004  | Voorheis   | A63B 37/0003 524/100 |
| 2007/0049419 | A1 |   | 3/2007  | Egashira et al. | |
| 2007/0184916 | A1 |   | 8/2007  | Shindo et al.   | |
| 2015/0065268 | A1 |   | 3/2015  | Nakajima et al. | |
| 2019/0290971 | A1 | * | 9/2019  | Kimura     | A63B 37/0075 |
| 2019/0375917 | A1 | * | 12/2019 | Shindo     | C08K 5/053 |
| 2020/0023240 | A1 | * | 1/2020  | Watanabe   | A63B 37/0075 |

(Continued)

FOREIGN PATENT DOCUMENTS

| JP | 2001070475 A | * | 3/2001 | ......... A63B 37/0003 |
| JP | 2007-61605 A |   | 3/2007 | |

(Continued)

Primary Examiner — Alvin A Hunter
(74) Attorney, Agent, or Firm — Sughrue Mion, PLLC

(57) ABSTRACT

In a golf ball having a core and a cover of one or more layer, the core is formed of a material molded under heat from a rubber composition containing
(a) a base rubber,
(b) water and/or a lower alcohol having a specific molecular weight,
(c) an α,β-unsaturated carboxylic acid and/or a metal salt thereof, and
(d) an organic peroxide.

The base rubber (a) is a rubber obtained by mixing together (a-1) a polybutadiene and (a-2) an unneutralized ethylene-unsaturated carboxylic acid copolymer, and subsequently neutralizing the copolymer with (a-3) a metal oxide. Component (a-2) has a specific acid content and accounts for a specific portion of the combined amount of components (a-1) and (a-2). The core surface and center have a specific JIS-C hardness difference therebetween.

This ball achieves both a lower spin rate and excellent durability while maintaining a high rebound.

6 Claims, No Drawings

(56) References Cited

U.S. PATENT DOCUMENTS

| | | | |
|---|---|---|---|
| 2020/0246664 A1* | 8/2020 | Watanabe | A63B 37/0084 |
| 2020/0306594 A1* | 10/2020 | Kimura | C08G 18/4063 |
| 2020/0330827 A1* | 10/2020 | Shindo | A63B 37/0038 |
| 2021/0101053 A1* | 4/2021 | Watanabe | A63B 37/0065 |
| 2021/0106878 A1* | 4/2021 | Watanabe | A63B 37/0063 |
| 2021/0106879 A1* | 4/2021 | Watanabe | A63B 37/0092 |
| 2021/0170237 A1* | 6/2021 | Watanabe | A63B 37/0051 |
| 2021/0187363 A1* | 6/2021 | Shindo | A63B 37/0092 |
| 2021/0236884 A1* | 8/2021 | Watanabe | A63B 37/0031 |
| 2021/0354005 A1* | 11/2021 | Shindo | C08K 3/22 |
| 2021/0355300 A1* | 11/2021 | Shindo | A63B 37/00621 |
| 2022/0249916 A1* | 8/2022 | Shindo | A63B 37/0051 |

FOREIGN PATENT DOCUMENTS

| | | | | |
|---|---|---|---|---|
| JP | 2007-209472 A | | 8/2007 | |
| JP | 2012-254304 A | | 12/2012 | |
| JP | 2015-47502 A | | 3/2015 | |
| JP | 2019-213606 A | | 12/2019 | |
| JP | 2023021029 A | * | 2/2023 | ....... A63B 37/00621 |

* cited by examiner

GOLF BALL

CROSS-REFERENCE TO RELATED APPLICATION

This non-provisional application claims priority under 35 U.S.C. § 119(a) on Patent Application No. 2021-206086 filed in Japan on Dec. 20, 2021, the entire contents of which are hereby incorporated by reference.

TECHNICAL FIELD

The present invention relates to a golf ball having a core and a cover of one or more layer.

BACKGROUND ART

Golf balls lately are predominantly two-piece solid golf balls or three-piece solid golf balls. These golf balls generally have a structure in which a cover of one or more layer made of various resin materials encases a core made of a rubber composition. The core accounts for most of the golf ball volume and exerts a large influence on ball properties such as rebound, feel on impact and durability. Recently, a number of disclosures have been made in which the cross-sectional hardness of the core is adjusted so as to achieve a specific core hardness gradient, thereby optimizing the spin properties of the ball on full shots with a driver or an iron and enabling the ball to travel an increased distance. Enlarging the hardness difference between the surface and center of the core is known to have the effect of reducing the spin rate of the ball on full shots with a driver. Moreover, prior findings have shown that a reduced spin rate on full shots leads to an increased distance. Hence, in order to improve the distance traveled by a golf ball, there exists a desire for art that increases the hardness difference at the core interior. One approach that has been proposed for achieving this aim is to give the core a structure made of two rubber layers. However, producing such a core involves a relatively large number of operations compared with a single-layer rubber core, and so there remains a desire for art that increases the hardness difference within a single-layer core.

Methods for adjusting the cross-sectional hardness of the core include, for example, suitably adjusting the compounding ingredients in the rubber composition of the core and also the vulcanization temperature and time. Alternatively, with regard to the compounding ingredients in the rubber composition of the core, another method involves selecting the types of co-crosslinking agent and organic peroxide to be used and adjusting their contents. The use of methacrylic acid, acrylic acid and metal salts thereof as co-crosslinking agents in the field of golf balls is known. However, adjusting the content of such co-crosslinking agents is intended primarily to modulate the feel of the ball on impact by regulating the core hardness, and is not capable of satisfying the desired spin properties.

JP-A 2015-47502 (and the corresponding U.S. Patent Application Publication No. 2015/0065268) discloses as new technology a golf ball in which, by enlarging the hardness difference between the surface and center of the core, a lower ball spin rate is achieved on full shots. In this publication, the core is obtained by including water in the core-forming rubber composition and molding and vulcanizing the composition. Also, in the golf ball disclosed in JP-A 2019-213606 (and the corresponding U.S. Patent Application Publication No. 2019/0375917), the core is obtained by including a lower alcohol in the core-forming rubber composition and molding and vulcanizing the composition. However, a drawback with the foregoing art is that the durability of the ball to impact decreases on account of the increase in the hardness difference between the surface and center of the core.

In addition, the following art which increases the durability of a golf ball to impact while maintaining the resilience of the core has been described. U.S. Patent Application Publication No. 2002/0086745 discloses art which involves, in a core-forming rubber composition, blending an ionomeric resin with a polybutadiene rubber. Also, JP-A No. 2007-209472 (and the corresponding U.S. Patent Application Publication No. 2007/0184916) discloses art which mixes together a polybutadiene rubber and an unneutralized ethylene-unsaturated carboxylic acid copolymer and subsequently neutralizes the copolymer with a metal cation source. Moreover, JP-A 2007-061605 and JP-A 2012-254304 (and the corresponding U.S. Patent Application Publication No. 2007/0049419) disclose rubber compositions which contain a polybutadiene rubber, an olefin-containing polymer having a specific acid content, and an inorganic metal compound. However, a drawback with all of this art is that a resin ingredient is included in the rubber composition, and increasing the amount of resin ingredient added greatly lowers the rebound of the golf ball.

SUMMARY OF THE INVENTION

It is therefore an object of the present invention to provide a golf ball which achieves both a lower spin rate and an excellent durability while maintaining a high rebound.

As a result of intensive investigations, we have discovered that certain desirable effects can be achieved by using as the essential ingredients in a rubber composition for a golf ball core: (a) a base rubber, (b) water and/or a lower alcohol having a molecular weight of less than 200, (c) an $\alpha,\beta$-unsaturated carboxylic acid and/or a metal salt thereof, and (d) an organic peroxide; by having the base rubber serving as component (a) be a rubber obtained by mixing together (a-1) a polybutadiene and (a-2) an unneutralized ethylene-unsaturated carboxylic acid copolymer and subsequently neutralizing the copolymer with (a-3) a metal oxide; and by adjusting the acid content of component (a-2) to 5 wt % or more and adjusting the component (a-2) content to not more than 10 parts by weight per 100 parts by weight of the combined amount of components (a-1) and (a-2). That is, hardness differences in the cross-sectional hardness at the core interior can be set to large values while maintaining the desired core hardness, low spin properties can be fully exhibited on golf ball shots, and the ball has an excellent durability to impact.

Accordingly, the invention provides a golf ball having a core and a cover of one or more layer, wherein the core is formed of a material molded under heat from a rubber composition containing:

(a) a base rubber,
 (b) water and/or a lower alcohol having a molecular weight of 200,
 (c) an $\alpha,\beta$-unsaturated carboxylic acid and/or a metal salt thereof, and
 (d) an organic peroxide;

the base rubber of component (a) is a rubber obtained by mixing together (a-1) a polybutadiene and (a-2) an unneutralized ethylene-unsaturated carboxylic acid copolymer and subsequently neutralizing the copolymer with (a-3) a metal oxide; component (a-2) has an acid content of 5 wt % or more; the content of component (a-2) is not more than 10 parts by weight per 100 parts by weight of the combined amount of components (a-1) and (a-2), and the core surface and center have a hardness difference therebetween, expressed on the JIS-C hardness scale, of 15 or more.

In a preferred embodiment of the golf ball of the invention, the unsaturated carboxylic acid in component (a-2) is acrylic acid or methacrylic acid.

In another preferred embodiment of the inventive golf ball, the unneutralized ethylene-unsaturated carboxylic acid copolymer (a-2) is completely neutralized by (a-3) the metal oxide.

In yet another preferred embodiment, the content of component (b) is from 0.1 to 10 parts by weight per 100 parts by weight of component (a).

In still another preferred embodiment, the lower alcohol of component (b) is one or more alcohol selected from the group consisting of butanol, glycerol, ethylene glycol, propylene glycol, butanetriol, trimethylolethane, trimethylolpropane, di(trimethylolpropane), pentaerythritol and sorbitol.

Advantageous Effects of the Invention

The golf ball of the invention is able to achieve both a lower spin rate and excellent durability while maintaining a high rebound.

DESCRIPTION OF THE PREFERRED EMBODIMENTS

The objects, features and advantages of the invention will become more apparent from the following detailed description.

The golf ball of the invention has a core and a cover of one or more layer. The core is not limited to only one layer, and may be constructed of two or more layers. The core is formed of a material molded under heat from a rubber composition containing as essential ingredients:
  (a) a base rubber,
  (b) water and/or a lower alcohol having a molecular weight of 200 or less,
  (c) an α,β-unsaturated carboxylic acid and/or a metal salt thereof, and
  (d) an organic peroxide.

The base rubber of component (a) is a rubber obtained by mixing together (a-1) a polybutadiene and (a-2) an unneutralized ethylene-unsaturated carboxylic acid copolymer, and subsequently neutralizing the copolymer with (a-3) a metal oxide.

It is desirable for the polybutadiene serving as component (a-1) to have, on the polymer chain thereof, a cis-1,4 bond content of at least 60%, preferably at least 80%, more preferably at least 90%, and most preferably at least 95%. When cis-1,4 bonds account for too few of the bonds on the polybutadiene molecule, the resilience may decrease.

The content of 1,2-vinyl bonds on the polybutadiene is generally 2% or less, preferably 1.7% or less, and more preferably 1.5% or less, of the polymer chain. When the content of 1,2-vinyl bonds is too high, the resilience may decrease.

The polybutadiene has a Mooney viscosity ($ML_{1+4}$ (100° C.)) of preferably at least 20, and more preferably at least 30. The upper limit is preferably not more than 120, more preferably not more than 100, and even more preferably not more than 80.

The term "Mooney viscosity" used herein refers to an industrial indicator of viscosity (JIS K 6300) measured with a Mooney viscometer, which is a type of rotary plastometer. This value is represented by the unit symbol $ML_{1+4}$ (100° C.), wherein "M" stands for Mooney viscosity, "L" stands for large rotor (L-type) and "1+4" stands for a pre-heating time of 1 minute and a rotor rotation time of 4 minutes. The "100° C." indicates that measurement was carried out at a temperature of 100° C.

The polybutadiene used may be one synthesized with a rare-earth catalyst or a group VIII metal compound catalyst.

The unneutralized ethylene-unsaturated carboxylic acid copolymer serving as component (a-2) has the effect in particular of lowering the spin rate of the ball following shots with a driver (W #1). The number of carbon atoms on this unsaturated carboxylic acid is preferably from 3 to 8. Specific examples include unsaturated carboxylic acids such as acrylic acid, methacrylic acid, maleic acid and fumaric acid. From the standpoint of imparting a high resilience, acrylic acid or methacrylic acid is preferred.

The acid content of component (a-2) is 5 wt % or more, preferably 7 wt % or more, more preferably 8 wt % or more, even more preferably 9 wt % or more, and most preferably 10 wt % or more. When this acid content is too low, a sufficiently high initial velocity and a good durability are not obtained. The upper limit in this acid content is preferably not more than 26 wt %, more preferably not more than 23 wt %, and even more preferably not more than 20 wt %.

The content of component (a-2) is not more than 10 parts by weight per 100 parts by weight of the combined amount of components (a-1) and (a-2). The higher the proportion accounted for by this component (a-2), the better the durability, but at more than 10 parts by weight, the core resilience ends up decreasing, leading to a decrease in the initial velocity of the ball.

It is desired that the unneutralized ethylene-unsaturated carboxylic acid copolymer serving as component (a-2) have a melt flow rate (MFR) which, from the standpoint of increasing dispersibility in the base rubber matrix, is at least 10 g/10 min, preferably at least 20 g/10 min, more preferably at least 30 g/10 min, even more preferably at least 40 g/10 min, and most preferably at least 50 g/10 min. The MFR is a value measured in accordance with JIS K7210-1 at a test temperature of 190° C. and under a test load of 21.18 N (2.16 kgf).

It is suitable for the unneutralized ethylene-unsaturated carboxylic acid copolymer serving as component (a-2) to have a melting point that is not more than 120° C., preferably not more than 115° C., more preferably not more than 110° C., even more preferably not more than 105° C., and most preferably not more than 100° C. The lower this melting point, the more readily component (a-2) disperses within the base rubber matrix. This melting point has a lower limit that is preferably at least 60° C., more preferably at least 70° C., and most preferably at least 80° C.

A commercial product may be used as the unneutralized ethylene-unsaturated carboxylic acid copolymer serving as component (a-2). Examples include Nucrel™ N1110H and Nucrel™ N1560. One of these may be used alone or two or more may be used together.

Illustrative, non-limiting, examples of the metal oxide serving as component (a-3) include magnesium carbonate, magnesium acetate, magnesium oxide, zinc oxide, zinc acetate, sodium hydroxide, sodium carbonate, calcium oxide, calcium hydroxide, lithium hydroxide, lithium carbonate, potassium hydroxide and potassium carbonate. One of these may be used alone or two or more may be used together.

The amount of component (a-3) included per 100 parts by weight of components (a-1) and (a-2) combined is preferably from 1 to 50 parts by weight, and more preferably from 2 to 30 parts by weight. When this amount is too small, the neutralization reaction may be inadequate and the rebound performance and durability may fall short. On the other hand, when this amount is too large, the core weight may become too heavy and the golf ball may end up exceeding the preferred weight range, which is undesirable.

With addition of the metal oxide serving as component (a-3) in the above-indicated amount, it is suitable for the unneutralized unsaturated carboxylic acid serving as component (a-2) to be at least 80 mol % neutralized. The degree of neutralization of this unsaturated carboxylic acid is more preferably at least 90 mol %, and most preferably 100 mol %. In other words, it is most preferable, from the standpoint of fully eliciting the desired effects of this invention, for the unneutralized ethylene-unsaturated carboxylic acid copolymer (a-2) to be completely neutralized by the metal oxide (a-3).

The method of mixing together the polybutadiene (a-1) and the unneutralized ethylene-unsaturated carboxylic acid copolymer (a-2) and subsequently neutralizing the copolymer with the metal oxide (a-3) is not particularly limited. One example is a method of preparation in which the base rubber serving as component (a) can be obtained by using a pressurizing kneader for rubber to thoroughly mix together components (a-1) and (a-2), then adding component (a-3) at a rubber temperature of at least 100° C., preferably at least 120° C., mixing at a rotor speed of 20 to 40 rpm for 3 to 20 minutes, and cooling. By means of such a method of preparation, a rubber composition having a chemical structure in which some or all of the carboxyl groups in component (a-2) have been subjected to a neutralization reaction with the metal oxide (a-3) in the presence of component (a-1) can be obtained.

The water that can be used as component (b) in this invention may be, without particular limitation, distilled water or tap water. The use of distilled water that is free of impurities is especially preferred. The water content per 100 parts by weight of the base rubber is preferably at least 0.1 part by weight, and more preferably at least 0.3 part by weight. The upper limit is preferably not more than 5 parts by weight, and more preferably not more than 4 parts by weight.

By including a suitable amount of such water, the moisture content of the rubber composition before vulcanization becomes preferably at least 1,000 ppm, and more preferably at least 1,500 ppm. The upper limit is preferably not more than 8,500 ppm, and more preferably not more than 8,000 ppm. When the moisture content of the rubber composition is too low, it may be difficult to obtain a suitable crosslink density, which may make it difficult to mold a golf ball that minimizes energy loss and has a reduced spin rate. On the other hand, when the moisture content of the rubber composition is too high, the core may be too soft, which may make it difficult to obtain a suitable core initial velocity.

Although it is also possible to add water directly to the rubber composition, the following methods (i) to (iii) may be employed to incorporate water:
(i) applying water in the form of a mist (i.e., as steam or by means of ultrasound) to some or all of the rubber composition (compounded material);
(ii) immersing some or all of the rubber composition in water;
(iii) letting some or all of the rubber composition stand for a given period of time in a high-humidity environment in a place where the humidity can be controlled, such as a constant humidity chamber.

The "high-humidity environment" is not particularly limited, so long as it is an environment capable of moistening the rubber composition, although a humidity of from 40 to 100% is preferred.

Alternatively, the water may be worked into a jelly state and added to the above rubber composition. Or a material obtained by first supporting water on a filler, unvulcanized rubber, rubber powder or the like may be added to the rubber composition. In such a form, the workability is better than when water is directly added to the composition, enabling the efficiency of golf ball production to be increased. The type of material in which a given amount of water has been included, although not particularly limited, is exemplified by fillers, unvulcanized rubbers and rubber powders in which sufficient water has been included. The use of a material which incurs no loss of durability or resilience is especially preferred. The moisture content of the above material is preferably at least 3 wt %, more preferably at least 5 wt %, and even more preferably at least 10 wt %. The upper limit is preferably not more than 99 wt %, and even more preferably not more than 95 wt %.

Alternatively, in this invention, a lower alcohol having a molecular weight of less than 200 may be used in place of the above water. As used herein, "alcohol" refers to a substance having one or more alcoholic hydroxyl group; such alcohols also encompass compounds obtained by the polycondensation of polyhydric alcohols having two or more hydroxyl groups. A "lower alcohol" refers to an alcohol which has a small number of carbon atoms; that is, alcohols having a small molecular weight. By including this lower alcohol in the rubber composition, when the rubber composition is vulcanized (cured), a cured rubber material (core) having a desired core hardness gradient can be obtained, making it possible to obtain a ball which fully achieves a lower spin rate when struck and thus has an excellent flight performance.

It is especially preferable for the lower alcohol to be a hexahydric or lower alcohol (an alcohol having six or fewer alcoholic hydroxyl groups). Specific examples include, but are not limited to, methanol, ethanol, propanol, butanol, ethylene glycol, diethylene glycol, propylene glycol, dipropylene glycol, tripropylene glycol, glycerol, butanetriol, trimethylolethane, trimethylolpropane, di(trimethylolpropane), pentaerythritol and sorbitol. The molecular weight of such alcohols is less than 200, preferably less than 150, and more preferably less than 100. When the molecular weight is too large, i.e., when the number of carbons is too high, the desired core hardness gradient cannot be obtained and it becomes impossible for the ball when struck to fully achieve a lower spin rate.

The content of the lower alcohol per 100 parts by weight of the base rubber is preferably at least 0.1 part by weight, more preferably at least 0.3 part by weight, and even more preferably at least 0.5 part by weight. The upper limit is preferably not more than 10 parts by weight, more preferably not more than 6 parts by weight, and even more preferably not more than 3 parts by weight. When this content is too high, the hardness may decrease and the desired feel, durability and rebound may not be obtained; when this content is too low, the desired core hardness gradient may not be obtained and so it may not be possible for the ball to fully achieve a reduced spin rate on shots.

Next, component (c), which serves as a co-crosslinking agent, is an $\alpha,\beta$-unsaturated carboxylic acid and/or a metal salt thereof. The number of carbon atoms on this unsaturated carboxylic acid is preferably from 3 to 8. Specific examples include unsaturated carboxylic acids such as acrylic acid, methacrylic acid, maleic acid and fumaric acid. Specific examples of the metal in the metal salts of these unsaturated carboxylic acids include zinc, sodium, magnesium, calcium and aluminum, with zinc being especially preferred. The co-crosslinking agent is most preferably zinc acrylate.

The component (c) content per 100 parts by weight of the base rubber serving as component (a) is preferably at least 10 parts by weight, more preferably at least 15 parts by weight, and even more preferably at least 20 parts by weight. The upper limit is preferably not more than 65 parts by weight, more preferably not more than 60 parts by weight, and even more preferably not more than 55 parts by weight. At a content lower than this range, the ball may be too soft and have a poor rebound. At a content higher than this range, the ball may be too hard, resulting in a poor feel on impact, and may also be brittle and thus have a poor durability.

The co-crosslinking agent serving as component (c) has a mean particle size of preferably from 3 to 30 μm, more preferably from 5 to 25 μm, and even more preferably from 8 to 15 μm. At a mean particle size for the co-crosslinking agent that is below 3 μm, the co-crosslinking agent tends to agglomerate within the rubber composition, leading to a rise in reactivity between molecules of acrylic acid and a decline in reactivity between molecules of the base rubber, as a result of which the golf ball may be unable to achieve a sufficient rebound performance. At a mean particle size for the co-crosslinking agent in excess of 30 μm, the co-crosslinking agent particles become too large, increasing the variability in the properties of the resulting golf balls.

Component (d) is an organic peroxide. This organic peroxide is preferably one having a one minute half-life temperature of between 110 and 185° C. Examples of such organic peroxides include dicumyl peroxide (Percumyl D, from NOF Corporation), 2,5-dimethyl-2,5-di(t-butylperoxy) hexane (Perhexa 25B, from NOF Corporation) and di(2-t-butylperoxyisopropyl)benzene (Perbutyl P, from NOF Corporation). The use of dicumyl peroxide is preferred. Other commercial products include Perhexa C-40, Niper BW and Peroyl L (all from NOF Corporation), and Luperco 231XL (from AtoChem Co.). These may be used singly, or two or more may be used together.

The content of component (d) per 100 parts by weight of the base rubber is preferably at least 0.1 part by weight, and more preferably at least 0.3 part by weight. The upper limit is preferably not more than 5 parts by weight, more preferably not more than 4 parts by weight, and even more preferably not more than 3 parts by weight.

Aside from above components (a) to (d), various additives such as fillers, antioxidants and organosulfur compounds may be included, provided that doing so is not detrimental to the objects of the invention.

Examples of fillers that may be suitably used include zinc oxide, barium sulfate and calcium carbonate. These may be used singly, or two or more may be used together. The filler content per 100 parts by weight of the base rubber may be set to preferably at least 1 part by weight, more preferably at least 3 parts by weight, and even more preferably at least 5 parts by weight. The upper limit in the filler content per 100 parts by weight of the base rubber may be set to preferably not more than 100 parts by weight, more preferably not more than 60 parts by weight, and even more preferably not more than 40 parts by weight. At a filler content that is too high or too low, it may not be possible to obtain a proper weight and a suitable rebound.

Illustrative, non-limiting, examples of antioxidants include phenolic antioxidants such as 2,2-methylenebis(4-methyl-6-tert-butyl phenol), 4,4-butylidenebis(3-methyl-6-tert-butylphenol) and 2,2-methylenebis(4-ethyl-6-tert-butylphenol). Commercial products that may be used include Nocrac NS-6, Nocrac NS-30 and Nocrac NS-5 (all products of Ouchi Shinko Chemical Industry Co., Ltd.). One of these may be used alone or two or more may be used in combination. The antioxidant content per 100 parts by weight of the base rubber, although not particularly limited, is preferably at least 0.05 part by weight, and more preferably at least 0.1 part by weight; the upper limit is preferably not more than 1.0 part by weight, more preferably not more than 0.7 part by weight, and even more preferably not more than 0.4 part by weight. At a content that is too high or too low, a suitable core hardness gradient may not be obtainable and it may be impossible to obtain a suitable rebound, durability and spin rate-lowering effect on full shots.

The organosulfur compounds are not particularly limited. Examples include thiophenols, thionaphthols, diphenylpolysulfides, halogenated thiophenols, and metal salts of these. Specific examples include the zinc salts of pentachlorothiophenol, pentafluorothiophenol, pentabromothiophenol and p-chlorothiophenol, and any of the following having 2 to 4 sulfur atoms: diphenylpolysulfides, dibenzylpolysulfides, dibenzoylpolysulfides, dibenzothiazoylpolysulfides and dithiobenzoylpolysulfides. These may be used singly, or two or more may be used together. Of these, preferred use can be made of the zinc salt of pentachlorothiophenol and/or diphenyldisulfide.

It is recommended that the amount of organosulfur compound included per 100 parts by weight of the base rubber be preferably at least 0.05 part by weight, more preferably at least 0.1 part by weight, and even more preferably at least 0.2 part by weight, and that the upper limit be preferably not more than 3 parts by weight, more preferably not more than 2 parts by weight, and even more preferably not more than 1 part by weight. Including too much organosulfur compound may result in a material molded under heat from the rubber composition (rubber vulcanizate) that has too low a hardness. On the other hand, including too little may make a rebound-improving effect unlikely.

The core can be produced by vulcanizing/curing a rubber composition containing the various above ingredients. For example, the core can be produced by using a mixing apparatus such as a Banbury mixer or a roll mill to knead the rubber composition, then using a core mold to compression mold or injection mold the kneaded composition and suitably heating the molded body at a temperature suitable for the organic peroxide and co-crosslinking agent to act, such as at between about 100° C. and about 200° C. for a period of 10 to 40 minutes, so as to cure the molded body.

Here, by compounding the ingredients as described above, the core—which is a rubber molded material that has been vulcanized/cured—can be provided with a hardness gradient in which the hardness difference between the surface and the center is large. Using this rubber molded material as the golf ball core enables the durability of the golf ball to be increased without compromising the good spin properties of the ball.

The core has a center hardness on the JIS-C hardness scale which, although not particularly limited, is preferably at least 40, more preferably at least 45, and even more preferably at least 50. The upper limit is preferably not more than 75, more preferably not more than 70, and even more preferably not more than 65. At a core center hardness outside of this range, the feel at impact may be poor, the durability may decline and it may not be possible to obtain a spin rate-lowering effect.

The core has a surface hardness on the JIS-C hardness scale which, although not particularly limited, is preferably at least 65, more preferably at least 70, and even more preferably at least 72. The upper limit is preferably not more than 95, more preferably not more than 90, and even more preferably not more than 88. When the surface hardness of the core is lower than this range, the ball rebound may decrease, as a result of which a sufficient distance may not be achieved. On the other hand, when the surface hardness of the core is higher than the above range, the feel at impact may be too hard and the durability to cracking on repeated impact may worsen.

The core has a hardness difference between the core surface and center which, expressed on the JIS-C hardness scale, is preferably at least 15, more preferably at least 20, even more preferably at least 24, and most preferably at least 30. The upper limit is preferably not more than 50, more preferably not more than 45, and even more preferably not more than 40. When this hardness difference is too small, the spin rate-lowering effect on shots with a W #1 may be inadequate and a good distance may not be achieved. On the other hand, when this hardness difference is too large, the initial velocity of the ball when struck may become lower, resulting in a shorter distance, or the durability of the ball to cracking on repeated impact may worsen. Here, "center hardness" refers to the hardness measured at the center of the cross-section obtained by cutting the core in half through the center, and "surface hardness" refers to the hardness measured at the spherical surface of the core. "JIS-C hardness" refers to the hardness measured with a spring-type durometer (JIS-C model) as specified in JIS K 6301-1975.

The core hardness gradient used in this invention is preferably one in which the hardness remains the same or increases, but does not decrease, from the center toward the surface of the core.

The core (material molded under heat) has a compressive hardness (deformation) when compressed under a final load of 1,275 N (130 kgf) from an initial load state of 98 N (10 kgf) which, although not particularly limited, is preferably at least 2.0 mm, more preferably at least 2.3 mm, even more preferably at least 2.5 mm, and most preferably at least 2.8 mm. The upper limit is preferably not more than 6.0 mm, more preferably not more than 5.5 mm, and even more preferably not more than 5.0 mm. When this value is too large, the core becomes too soft, as a result of which a sufficient spin rate-lowering effect may not be obtained and the resilience may decrease. When this value is too small, a spin rate-lowering effect cannot be obtained and the feel of the ball at impact becomes hard.

The core has a diameter which is not particularly limited and depends also on the layer structure of the golf ball to be manufactured. The core diameter is preferably at least 30 mm, and more preferably at least 35 mm, but is preferably not more than 41 mm, and more preferably not more than 40 mm. At a core diameter outside of this range, the initial velocity of the ball may decrease or a suitable spin performance may not be obtained.

Next, the cover of one or more layer encasing the core is described.

The cover material is not particularly limited; use can be made of a known material such as various types of ionomer resins and urethane elastomers that are used in golf balls.

To achieve an even further spin rate-lowering effect in the ball, it is especially desirable to use a highly neutralized ionomeric material in the layer adjoining the core. Specifically, it is preferable to use a material obtained by blending components (A) to (D) below:

100 parts by weight of a resin component composed of, in admixture,
(A) a base resin of (A-1) an olefin-unsaturated carboxylic acid random copolymer and/or a metal ion neutralization product of an olefin-unsaturated carboxylic acid random copolymer mixed with (A-2) an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer in a weight ratio between 100:0 and 0:100, and
(B) a non-ionomeric thermoplastic elastomer in a weight ratio between 100:0 and 50:50;
(C) from 5 to 80 parts by weight of a fatty acid and/or fatty acid derivative having a molecular weight of from 228 to 1,500; and
(D) from 0.1 to 17 parts by weight of a basic inorganic metal compound capable of neutralizing un-neutralized acid groups in components (A) and (B).

In particular, when using a mixed material of components (A) to (D), it is preferable to utilize one in which at least 70% of the acid groups are neutralized.

The material making up the outermost layer of the cover is preferably composed primarily of a urethane material, especially a thermoplastic urethane elastomer.

In addition, one or more intermediate layer may be formed between the layer adjoining the core and the outermost cover layer. In this case, it is preferable for a thermoplastic resin such as an ionomer to be used as the intermediate layer material.

To obtain the above cover, use may be made of, for example, a method that involves placing within a mold, according to the type of ball, a single-layer core or a multilayer core of two or more layers that has been prefabricated, mixing and melting the above mixture under applied heat, and injection-molding the molten mixture over the core so as to encase the core with the desired cover. In this way, production of the cover can be carried out in a state where excellent thermal stability, flowability and processability are assured. As a result, the golf ball ultimately obtained has a high rebound, and moreover has a good feel at impact and an excellent scuff resistance. Alternatively, use may be made of a cover-forming method other than the foregoing, such as one in which, for example, a pair of hemispherical half-cups are molded beforehand from the cover material, following which the core is enclosed within the half-cups and molding is carried out under applied pressure at between 120° C. and 170° C. for a period of 1 to 5 minutes.

When the cover is made of a single layer, the thickness thereof may be set to from 0.3 to 3.0 mm. When the cover is a two-layer cover, the thickness of the outer cover layer may be set to from 0.3 to 2.0 mm, and the thickness of the inner cover layer may be set to from 0.3 to 2.0 mm. The Shore D hardness of each layer making up the cover (cover layer), although not particularly limited, is set to preferably at least 40, and more preferably at least 45; the upper limit is preferably not more than 70, and more preferably not more than 65.

Numerous dimples are formed on the surface of the outermost layer of the cover. In addition, the cover may be subjected to various types of treatment, such as surface preparation, stamping and painting. Particularly in cases where such surface treatment is carried out on the above cover, the good moldability of the cover surface enables the work to be carried out efficiently.

The golf ball of the invention is not particularly limited as to the type of ball, so long as it has a core and a cover of one or more layer. Illustrative examples include solid golf balls such as two-piece and three-piece solid golf balls having a solid core encased by a cover, and multi-piece golf balls having a structure of three or more layers; and also wound golf balls having a wound core that is encased by a single-layer cover or a cover with a multilayer structure of two or more layers.

EXAMPLES

Examples according to the invention and Comparative Examples are given below by way of illustration, although the invention is not limited by the following Examples.

Examples 1 to 6, Comparative Examples 1 to 5

Using rubber compositions in which the chief ingredients are the polybutadienes shown in Table 1 below, rubber compositions are prepared according to the rubber formulations (ingredients and contents thereof) for Examples 1 to 6 and Comparative Examples 1 to 5. The methods for mixing and molding these rubber compositions are as follows.

Methods for Mixing and Molding Rubber Compositions

In each Example, the core composition is prepared using the core materials shown in Table 1 below. First, using the Labo Plastomill® from Toyo Seiki Seisaku-sho, Ltd., the polybutadiene rubber (a-1) and the ethylene-methacrylic acid copolymer of component (a-2) or (a-2') are mixed for 10 minutes at a temperature setting of 120° C. and 30 rpm, following which the zinc oxide (a-3) is added and mixing is carried out for 5 minutes at 30 rpm. The mixture is then discharged and cooled. In a second step, zinc acrylate (c), an antioxidant and the zinc salt of pentachlorothiophenol are added to the above mixture and, at a temperature setting of 100° C., mixing is carried out in the Labo Plastomill® for 5 minutes at 30 rpm, following which the mixture is discharged and cooled. In a third step, the water and alcohol serving as component (b) and the organic peroxide (d) are added to the resulting mixture and, at a temperature setting of 40° C., mixing is carried out in the Labo Plastomill® for 5 minutes at 30 rpm, following which the mixture is discharged. The resulting mixture is vulcanized at 155° C. for 20 minutes and, after passing through a core surface abrading step, a core having a 38.5 mm diameter is produced.

TABLE 1

| Formulation (pbw) | | Comparative Example 1 | 2 | 3 | 4 | Example 1 | 2 | 3 | 4 | 5 | 6 | Comp. Ex. 5 |
|---|---|---|---|---|---|---|---|---|---|---|---|---|
| (a-1) | Polybutadiene | 100 | 100 | 98 | 95 | 98 | 95 | 98 | 98 | 95 | 90 | 85 |
| (a-2') | AN4214C (acid content, 4 wt %) | | | 2 | 5 | | | | | | | |
| (a-2) | N1110 (acid content, 11 wt %) | | | | | 2 | 5 | | | | | |
| (a-2) | N1560 (acid content, 15 wt %) | | | | | | | 2 | 2 | 5 | 10 | 15 |
| (a-3) | Zinc oxide | 17.5 | 9.9 | 9.9 | 9.9 | 9.9 | 9.9 | 9.9 | 14.4 | 9.9 | 9.9 | 9.9 |
| (b) | Water | | 1 | 1 | 1 | 1 | 1 | 1 | | 1 | 1 | 1 |
| (b) | Propylene glycol | | | | | | | | 1.5 | | | |
| (c) | Zinc acrylate | 34 | 49 | 49 | 49 | 49 | 49 | 49 | 38 | 49 | 49 | 49 |
| (d) | Organic peroxide | 1 | 1 | 1 | 1 | 1 | 1 | 1 | 0.5 | 1 | 1 | 1 |
| — | Antioxidant (1) | 0.1 | 0.1 | 0.1 | 0.1 | 0.1 | 0.1 | 0.1 | | 0.1 | 0.1 | 0.1 |
| — | Antioxidant (2) | | | | | | | | 0.3 | | | |
| — | Zinc salt of pentachlorothiophenol | 0.5 | 0.5 | 0.5 | 0.5 | 0.5 | 0.5 | 0.5 | 0.5 | 0.5 | 0.5 | 0.5 |

Details on the rubber formulations in Table 1 are given below.

Polybutadiene rubber: Available under the trade name "BR01" from JSR Corporation AN4214C, N1110H and N1560:
  Ethylene-unsaturated carboxylic acid copolymers available as Nucrel grades from Dow-Mitsui Polychemicals Co., Ltd.

Zinc oxide: Available as "Zinc Oxide Grade 3" from Sakai Chemical Co., Ltd.

Water: Distilled water

Propylene glycol (lower divalent alcohol):
  molecular weight, 76.1 (Hayashi Pure Chemical Ind., Ltd.)

Zinc acrylate: Available under the trade name "ZN-DA85S" (85% zinc acrylate/15% zinc stearate) from Nippon Shokubai Co., Ltd.

Organic Peroxide: Dicumyl peroxide, available under the trade name "Percumyl D" from NOF Corporation Antioxidant (I): Available under the trade name "Nocrac NS-6" from Ouchi Shinko Chemical Industry Co., Ltd.

Antioxidant (II): Available under the trade name "Nocrac MBN" from Ouchi Shinko Chemical Industry Co., Ltd.

Zinc salt of pentachlorothiophenol:
  Available from Wako Pure Chemical Industries, Ltd.

Details on the above Nucrel grades (ethylene-unsaturated carboxylic acid copolymers) are shown below in Table 2.

TABLE 2

| Grade | Neutralizing metal | Type of acid | Acid content (wt %) | MFR (g/10 min) | Melting point (° C.) |
|---|---|---|---|---|---|
| AN4214C | unneutralized | MAA | 4 | 7 | 105 |
| N1110H | unneutralized | MAA | 11 | 100 | 95 |
| N1560 | unneutralized | MAA | 15 | 60 | 90 |

MAA: Methacrylic acid

Cross-Sectional Hardnesses of Core

The cross-sectional hardnesses at the surface and center of the 38.5 mm diameter core in each of the above Examples and Comparative Examples are measured by the following methods. The hardness differences therebetween are shown in Table 1.

(1) Surface Hardness of Core

At a temperature of 23±1° C., the hardnesses at four random points on the core surface are measured with a JIS-C durometer by perpendicularly setting the indenter of the durometer against the spherical surface of the core. The average value of these measurements is treated as the measured value for one core, and the average value for three measured cores is determined.

(2) Cross-Sectional Hardnesses of Core

The core is cut through the center to obtain a flat cross-sectional plane. At a temperature of 23±1° C., the hardness at the center of the hemispherical core is measured with a JIS-C durometer by perpendicularly setting the indenter of the durometer against the flat cross-section, thereby obtaining the measured value for one core. The average value for three measured cores is determined.

Formation of Cover (Intermediate Layer and Outermost Layer)

Next, using an injection mold, the intermediate layer material (ionomeric resin material) shown in Table 3 is injection-molded over the surface of the core, forming an intermediate layer having a thickness of 1.3 mm and a Shore D hardness of 64. Using a different injection mold, the outermost layer material (urethane resin material) shown in Table 3 is then injection-molded over the intermediate layer-encased sphere, forming an outermost layer having a thickness of 0.8 mm and a Shore D hardness of 40.

TABLE 3

| Formation (pbw) | Intermediate layer | Outermost layer |
|---|---|---|
| Himilan 1706 | 35 | |
| Himilan 1557 | 15 | |
| Himilan 1605 | 50 | |
| TPU | | 100 |
| Polyethylene wax | | 1.0 |
| Isocyanate compound | | 6.3 |
| Titanium oxide | | 3.3 |
| Trimethylolpropane | 1.1 | |

Details on the compounding ingredients in Table 3 are given below.

Himilan® 1706, Himilan® 1557 and Himilan® 1605:
Ionomer resins available from Dow-Mitsui Polychemicals Co., Ltd.
TPU: An ether-type thermoplastic polyurethane available under the trademark Pandex® from DIC Covestro Polymer, Ltd.; Shore D hardness, 40
Polyethylene wax: Available under the trade name "Sanwax 161P" from Sanyo Chemical Industries, Ltd.
Isocyanate compound: 4,4'-Diphenylmethane diisocyanate The compressive deformation, initial velocity, spin rate and durability of the resulting golf balls are evaluated by the following methods. The results are shown in Table 4.

Compressive Deformation of Ball

The compressive deformation (mm) of the ball when compressed at a temperature of 23±1° C. and a rate of 10 mm/s under a final load of 1,275 N (130 kgf) from an initial load of 98 N (10 kgf) is measured, and the average value for ten measured balls is determined.

Initial Velocity and Backspin Rate on Driver (W #1) Shots

A driver (W #1) is mounted on a golf swing robot and the initial velocity and backspin rate of the ball immediately after being struck at a head speed of 45 m/s is measured with a launch monitor. The club used is the TourB XD-3 Driver (2016 model; loft angle, 9.5°) manufactured by Bridgestone Sports Co., Ltd.

Durability

The durability of the golf ball is evaluated using an ADC Ball COR Durability Tester manufactured by Automated Design Corporation (U.S.). This tester fires a golf ball pneumatically and causes it to consecutively strike two metal plates arranged in parallel. The incident velocity against the metal plates is set to 43 m/s. The number of shots required for the golf ball to crack is measured, and the average value of the measurements taken for ten golf balls is calculated. Durability indices for the balls in the respective Examples are determined relative to a reference value of 100 for the average number of shots required for the ball obtained in Comparative Example 2 to crack and are shown in Table 4.

TABLE 4

| | | Comparative Example | | | | Example | | | | | | Comp. Ex. |
|---|---|---|---|---|---|---|---|---|---|---|---|---|
| | | 1 | 2 | 3 | 4 | 1 | 2 | 3 | 4 | 5 | 6 | 5 |
| Core hardness difference, JIS-C (surface − center) | | 11.2 | 26.0 | 25.2 | 25.4 | 24.8 | 25.0 | 24.7 | 33.7 | 24.8 | 24.8 | 25.2 |
| Ball properties | Diameter (mm) | 42.70 | 42.70 | 42.70 | 42.71 | 42.71 | 42.70 | 42.69 | 42.71 | 42.70 | 42.70 | 42.70 |
| | Weight (g) | 45.39 | 45.44 | 45.26 | 45.41 | 45.26 | 45.33 | 45.38 | 45.24 | 45.40 | 45.39 | 45.41 |
| | Compressive deformation (mm) | 2.28 | 2.27 | 2.28 | 2.31 | 2.21 | 2.24 | 2.22 | 2.29 | 2.22 | 2.23 | 2.28 |
| | Initial velocity (m/s) | 77.33 | 77.33 | 77.30 | 77.15 | 77.34 | 77.34 | 77.33 | 77.37 | 77.33 | 77.32 | 77.18 |
| | Durability (index) | 150 | 100 | 105 | 112 | 120 | 142 | 126 | 127 | 160 | 184 | 221 |
| | Backspin rate (W#1) (rpm) | 3,349 | 3,100 | 3,047 | 3,033 | 3,077 | 3,074 | 3,106 | 3,003 | 3,114 | 3,076 | 3,046 |

It is apparent from Table 4 that the golf balls in Examples 1 to 6 according to the invention all have an improved durability without a loss of rebound, while maintaining a good spin performance. Also, as the acid content of component (a-2) becomes higher, ionic crosslinking between the unsaturated carboxylic acid and the metal oxide (a-3) is expected to occur more often within the polybutadiene (a-1). As a result, it is apparent that the durability improves.

By contrast, Comparative Examples 1 to 5 are inferior in the following respects to the Examples of the invention.

In Comparative Example 1, component (b) is not included in the core-forming rubber composition and the core center/surface hardness difference is small, as a result of which the backspin rate on shots with a driver (W #1) is high.

In Comparative Example 2, component (a-2) is not included in the core-forming rubber composition, and so the durability is not improved.

In Comparative Example 3, the acid content of component (a-2) included in the core-forming rubber composition is low, as a result of which the initial velocity and the durability are not sufficiently improved.

In Comparative Example 4, the acid content of component (a-2) included in the core-forming rubber composition is low, as a result of which the initial velocity is low.

In Comparative Example 5, the acid content of component (a-2) included in the core-forming rubber composition is high, as a result of which the initial velocity is low.

Japanese Patent Application No. 2021-206086 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball comprising a core and a cover of one or more layer, wherein the core is formed of a material molded under heat from a rubber composition comprised of:
   (a) a base rubber,
   (b) water or a lower alcohol having a molecular weight of 200 or less,
   (c) an α,β-unsaturated carboxylic acid or a metal salt thereof or both, and
   (d) an organic peroxide;

the base rubber of component (a) is a rubber obtained by mixing together (a-1) a polybutadiene and (a-2) an unneutralized ethylene-unsaturated carboxylic acid copolymer, and subsequently neutralizing the copolymer with (a-3) a metal oxide; component (a-2) has an acid content of 10 wt % or more; the content of component (a-2) is not more than 10 parts by weight per 100 parts by weight of the combined amount of components (a-1) and (a-2); and the core surface and center have a hardness difference therebetween, expressed on the JIS-C hardness scale, of 15 or more, and wherein the unsaturated carboxylic acid in component (a-2) is methacrylic acid and the degree of neutralization of the methacrylic acid by a metal cation is zero mol %.

2. The golf ball of claim 1, wherein the unneutralized ethylene-unsaturated carboxylic acid copolymer (a-2) is completely neutralized by (a-3) the metal oxide.

3. The golf ball of claim 1, wherein the content of component (b) is from 0.1 to 10 parts by weight per 100 parts by weight of component (a).

4. The golf ball of claim 1, wherein the lower alcohol of component (b) is one or more alcohol selected from the group consisting of butanol, glycerol, ethylene glycol, propylene glycol, butanetriol, trimethylolethane, trimethylolpropane, di(trimethylolpropane), pentaerythritol and sorbitol.

5. A method for manufacturing a golf ball including a core and a cover of one or more layer, wherein the core is formed of a material molded under heat from a rubber composition comprised of: (a) a base rubber, (b) water or a lower alcohol having a molecular weight of 200 or less, (c) an α,β-unsaturated carboxylic acid or a metal salt thereof or both, and (d) an organic peroxide, the method comprising
   a step of mixing together (a-1) a polybutadiene and (a-2) an unneutralized ethylene-unsaturated carboxylic acid copolymer, and
   a step of subsequently neutralizing the copolymer with (a-3) a metal oxide, thereby to obtain the base rubber of component (a).

6. The method of claim 5, wherein the components (a-1) and (a-2) are mixed by using a pressurizing kneader for rubber and then the component (a-3) is added at a temperature of at least 100° C., with mixing at a rotor speed of 20 to 40 rpm for 3 to 20 minutes.

* * * * *